July 4, 1950 W. A. YARBROUGH 2,513,544
INSECT DESTROYER
Filed Dec. 20, 1945 2 Sheets-Sheet 1
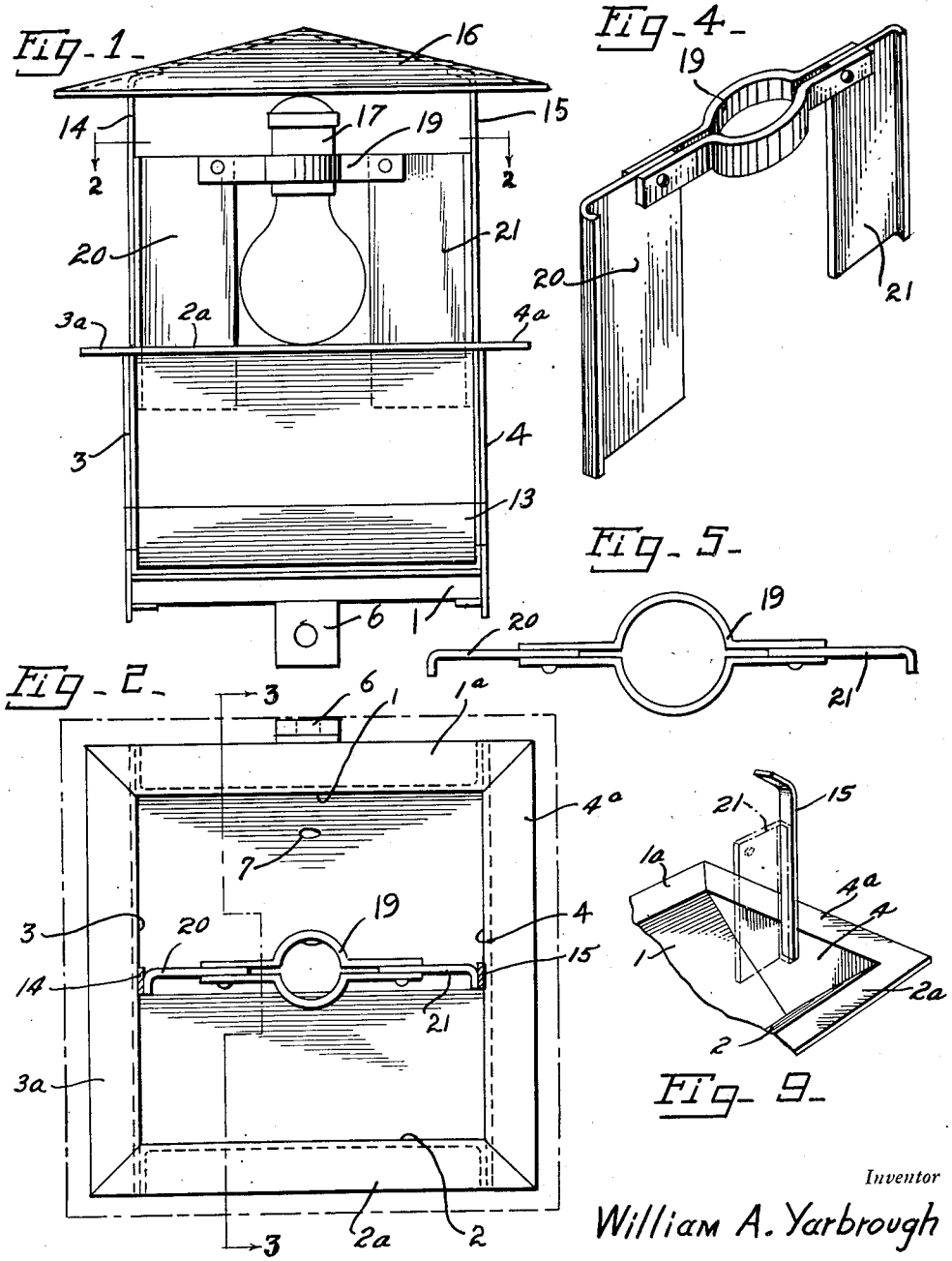
Inventor
William A. Yarbrough
By Clarence A. O'Brien
and Harvey B. Jacobson
Attorneys July 4, 1950  W. A. YARBROUGH  2,513,544
INSECT DESTROYER
Filed Dec. 20, 1945  2 Sheets-Sheet 2
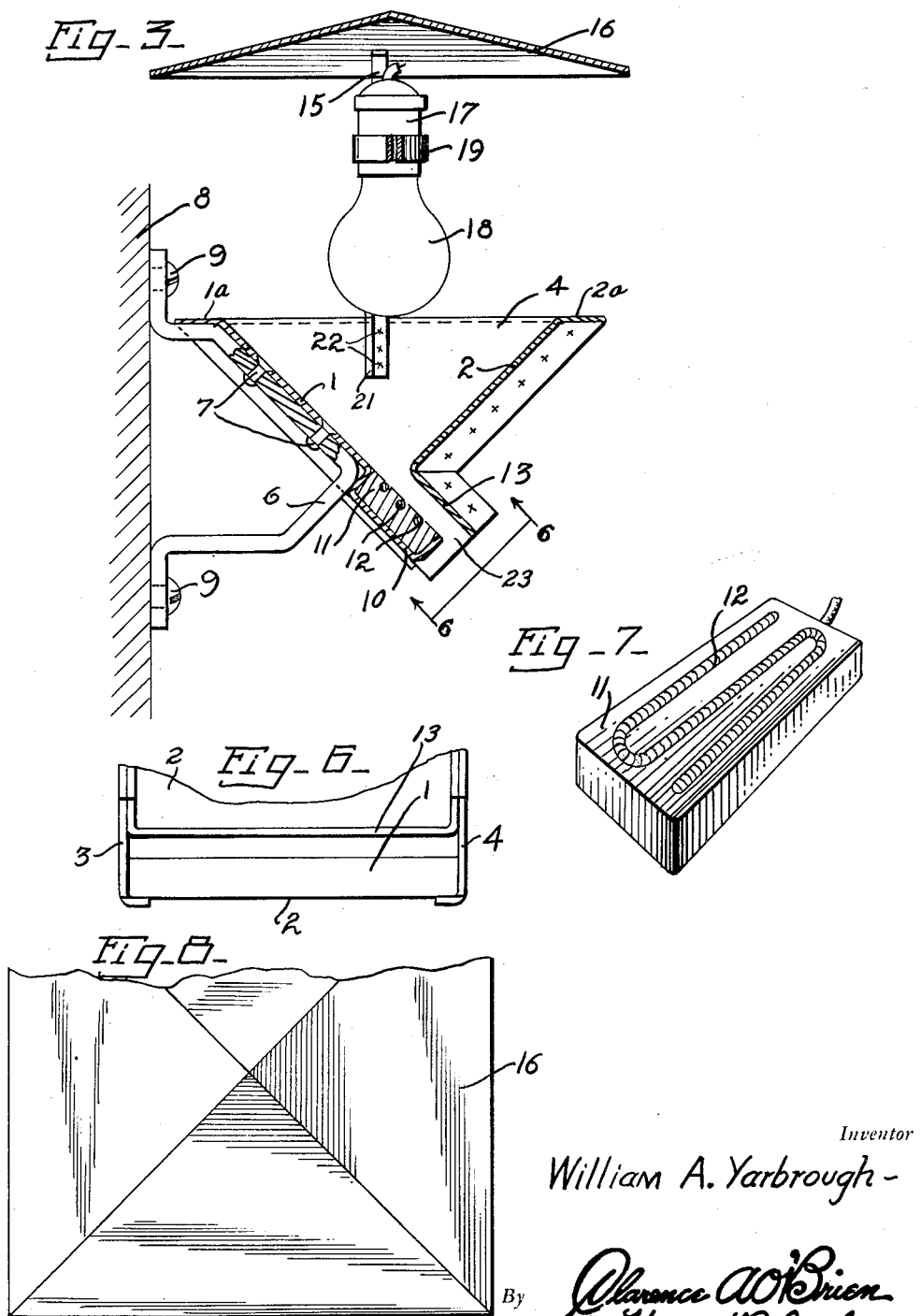
Inventor
William A. Yarbrough
By Clarence A. O'Brien
and Harvey B. Jacobson
Attorneys Patented July 4, 1950

2,513,544

UNITED STATES PATENT OFFICE 2,513,544

INSECT DESTROYER

William A. Yarbrough, Waynesboro, Va.

Application December 20, 1945, Serial No. 636,173

2 Claims. (Cl. 43—113)

1

This invention relates to an insect destroyer, and more particularly to an insect destroyer which will attract and destroy night flying insects.

An object of the invention is to provide an improved form of insect destroyer which will attract night flying insects and cremate the same.

Another object of the invention is to provide an improved night-flying-insect destroyer having means for attracting the insects to the destroyer, and separate means for cremating the insects upon coming in contact with the destroyer.

A further object of the invention is to provide an insect destroyer which will be relatively inexpensive to manufacture and produce.

Other objects will appear as the description proceeds.

In the accompanying drawings which form a part of this application:

Figure 1 is a side elevation of the improved insect destroyer;

Figure 2 is a transverse sectional view taken on the line 2—2 of Figure 1;

Figure 3 is a vertical sectional view taken on the line 3—3 of Figure 2;

Figure 4 is a perspective view of the lamp socket engaging clamp with spaced baffle members connected thereto;

Figure 5 is a plan view of the clamp and baffle members shown in Figure 4;

Figure 6 is a detail view taken on the line 6—6 of Figure 3;

Figure 7 is a perspective view of the porcelain block and heating element supported thereon;

Figure 8 is a plan view of the cover for the insect destroyer showing the same partly broken away; and Figure 9 is a fragmentary view, in perspective, further illustrating the arrangement of certain of the parts in this invention.

Like characters of reference are used throughout the following specification and the accompanying drawings to designate corresponding parts.

In carrying out the invention it will be understood that the body and cover for the destroyer will be made preferably from a light gauge of metal which may be easily shaped and welded together to form the completed insect destroyer.

The body of the insect destroyer comprises the oppositely disposed sloping sides 1 and 2, which are secured in their respective position by means of the end plates 3 and 4, which are spot welded to and between the sides 1 and 2 to hold the several parts assembled. The sides 1 and 2 and the end plates 3 and 4 have integral outwardly horizontally extending flat rim portions 1a, 2a, 3a, and 4a.

In order that the insect destroyer may be suitably supported, a supporting bracket 6 is riveted at 7 to the under surface of the side 1, and will be secured to a suitable support 8 by means of the screws 9 extending through the ends of said bracket 6.

The lower end of the sloping side 1 will be shaped to form a transversely extending groove 10 in which the elongated porcelain block 11 will be seated, said block in turn forming a support for an electrical heating element 12 which will be suitably secured in the block 11 and connected to a source of electrical current (not shown). As seen from Figure 3, the upper surface of the heating element will extend flush with the upper surface of the side 1. The side 2 opposite the side 1 will slope toward the said side 1 and will be bent outwardly at right angles as at 13 adjacent its lower end to extend parallel with and spaced a short distance above the heating element 12, thereby forming the outlet opening 23.

The end plates 3 and 4 will have welded thereto upstanding bars 14 and 15 to support the sloping cover 16, which will overlie the insect destroyer to protect the same from rain and snow.

An electric socket 17 is adapted to support a lamp bulb 18 and to be engaged by the split clamp 19, which extends laterally on the opposite sides of the said socket, and support the baffle plates 20 and 21 which depend downwardly to a point below the lamp bulb 18 and below the upper ends of the sloping sides 1 and 2 of the destroyer body. The outer ends of the plate 20 and 21 are bent forwardly and are spot welded at 22 to the end plates 3 and 4.

A suitable source of electrical energy (not shown) will be connected with the electric socket 17, and a lamp bulb of 60 watts will suffice when illuminated to attract insects to the destroyer. The heating element 12 will be incandescent when heated.

From the foregoing description, it will be apparent that the illuminated bulb will attract the insects which will fly into the baffle plates 20 and 21, where they will drop onto the incandescent heating element 12 to be instantly cremated. Due to the arrangement of the sloping heating element 12 and the adjacent parallel end 13 of the side 2, the cremated insects will drop onto the ground through the outlet opening at 23, and will not clog the device. Furthermore, no collecting means will be required to collect the cremated insects.

From the preferred form of insect destroyer as has been illustrated and described, it will be understood that I do not intend to limit myself to the specific construction, as many minor changes in detail of construction may be resorted to without departure from the spirit of the invention.

Having thus described my invention what I claim as new and desire to secure by Letters Patent of the United States is:

1. An insect destroyer including a body having downwardly converging sides, lower end portions of said sides comprising a discharge tube disposed at an acute angle with the vertical to hinder the passage of insects therethrough, and cremating means operatively mounted in said tube.

2. An insect destroyer including a body having downwardly converging sides, lower end portions of said sides comprising a discharge tube disposed at an acute angle with the vertical to hinder the passage of insects therethrough, and cremating means operatively mounted in said tube, said cremating means including an electric heating element operatively mounted on the lower inside portion of said tube.

WILLIAM A. YARBROUGH.

REFERENCES CITED

The following references are of record in the file of this patent:

UNITED STATES PATENTS

| Number | Name | Date |
| --- | --- | --- |
| 473,778 | Puckler | Apr. 26, 1892 |
| 779,672 | Smith | Jan. 10, 1905 |
| 1,037,688 | Troth | Sept. 3, 1912 |
| 1,087,198 | Steward | Feb. 17, 1914 |
| 1,397,218 | Lackie | Nov. 15, 1921 |

FOREIGN PATENTS

| Number | Country | Date |
| --- | --- | --- |
| 97,221 | Switzerland | Jan. 2, 1923 |